United States Patent
Xie et al.

(10) Patent No.: US 11,860,650 B1
(45) Date of Patent: Jan. 2, 2024

(54) METHOD FOR MONITORING AND CONTROLLING SUPPORTING POSTURE OF SUPPORTING-TYPE HYDRAULIC SUPPORT

(71) Applicant: SHANDONG UNIVERSITY OF SCIENCE AND TECHNOLOGY, Qingdao (CN)

(72) Inventors: Yunyue Xie, Qingdao (CN); Shaoqi Zhang, Qingdao (CN); Weikang Song, Qingdao (CN); Maolin Tian, Qingdao (CN); Hongtian Xiao, Qingdao (CN); Zhaosheng Meng, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/260,388

(22) PCT Filed: Apr. 25, 2022

(86) PCT No.: PCT/CN2022/088885
§ 371 (c)(1),
(2) Date: Jul. 5, 2023

(87) PCT Pub. No.: WO2023/087619
PCT Pub. Date: May 25, 2023

(30) Foreign Application Priority Data

Nov. 19, 2021 (CN) .......................... 202111373397.5

(51) Int. Cl.
    G05D 3/20 (2006.01)
(52) U.S. Cl.
    CPC ...................... G05D 3/20 (2013.01)
(58) Field of Classification Search
    None
    See application file for complete search history.

(56) References Cited

U.S. PATENT DOCUMENTS

2017/0335688 A1*  11/2017  Siegrist ................. E21F 17/185
2021/0010373 A1*   1/2021  Wang ..................... E21D 15/51

FOREIGN PATENT DOCUMENTS

CN           114111699 A      3/2022

OTHER PUBLICATIONS

Notification of Grant in Corresponding Chinese Application No. 202111373397.5, dated Aug. 11, 2022; 3 pgs.

(Continued)

*Primary Examiner* — Mohammad Ali
*Assistant Examiner* — Saad M Kabir
(74) *Attorney, Agent, or Firm* — HAUPTMAN HAM, LLP

(57) ABSTRACT

A monitoring and controlling method for a supporting pose of a hydraulic support includes reading length parameters of props; establishing a pose monitoring mathematic model; based on an interpolation algorithm, obtaining pose parameters including associated pose parameters of an angle of height, an angle of roof attachment, and angles of inclination of the props. The method further includes based on the support pose monitoring process, determining a current supporting pose; obtaining a contour line of a roof above the support, and determining a bulging edge of the roof; obtaining a height difference of a support canopy and the roof; calculating a target height and a target angle of roof attachment of the hydraulic support; based on a pose control mathematic model, calculating a target angle of height of the support; and substituting the target parameters into the pose monitoring mathematic model to solve target lengths of the props.

10 Claims, 3 Drawing Sheets

(56) References Cited

OTHER PUBLICATIONS

International Search Report in Corresponding International Application No. PCT/CN2022/088885, dated Aug. 23, 2022; 8 pgs.
Written Opinion in Corresponding International Application No. PCT/CN2022/088885, dated Aug. 23, 2022; 8 pgs.

* cited by examiner

METHOD FOR MONITORING AND CONTROLLING SUPPORTING POSTURE OF SUPPORTING-TYPE HYDRAULIC SUPPORT

RELATED APPLICATIONS

The present application is a U.S. National Phase of International Application Number PCT/CN2022/088885, filed Apr. 25, 2022, and claims the priority of Chinese Application No. 202111373397.5, filed Nov. 19, 2021.

TECHNICAL FIELD

The present disclosure relates to the field of smart mining equipment technologies, and in particular to a monitoring and controlling method for a supporting pose of a supporting type hydraulic support.

BACKGROUND

On an underground mining working face, hydraulic supports are a key supporting equipment which is responsible for supporting roofs to ensure safe working space and the like for coal miners and walking persons. During use of the supports, the following problems occurring to the hydraulic support pose monitoring work include: after occurrence of cutting actions, the supports fail to lift quickly the supporting working face roofs, resulting in exposure of the roofs for long, and negatively affecting roof control; the working pose of the hydraulic supports is not under real time monitoring feedback mode, and especially, the low-head and ack-ack bearing poses of a canopy front end and a canopy rear end are not under real time monitoring feedback mode; since there is no correspondence between the hydraulic support pose and support parameter, a ground control center cannot carry out virtual visual control and remote intervention on a current support state.

In the prior arts, a method of determining a working pose of a shield hydraulic support and a calculation method of obtaining reasonable supporting resistance and a supporting position of a support after determination of a pose of the support are employed to achieve remote monitoring on a running pose and a supporting state of the shield hydraulic support. In an online monitoring method of a running pose of a shield hydraulic support, angle sensors are deployed on the support canopies and connection bars, and pressure sensors are deployed on props, so as to obtain mechanical characteristics and supporting pose monitoring of the support during a supporting process.

The existing monitoring solutions are mostly used for monitoring for the supporting pose of the hydraulic supports and cannot effectively carry out accurate control on a future pose of the hydraulic support.

SUMMARY

In order to achieve full-time monitoring and accurate control on an action pose of a hydraulic support, and further effectively control roof subsidence and estimate supporting quality in real time, the present disclosure provides a monitoring and controlling method for a supporting pose of a supporting type hydraulic support. The specific technical solution is shown below.

A monitoring and controlling method for a supporting pose of a supporting type hydraulic support is provided, which includes:

A. support pose monitoring process:
 a1. by using a prop level sensor of the hydraulic support, reading length parameters of a front prop and a rear prop;
 a2. in combination with a relationship of length parameter and angle parameter of the support, establishing a pose monitoring mathematic model;
 a3. based on an interpolation algorithm, solving equilibrium equations of the pose monitoring mathematic model to obtain pose parameters including associated pose parameters of an angle of height, an angle of roof attachment, an angle of inclination of the front prop and an angle of inclination of the rear prop;

B. support pose control process:
 b1. based on the parameters obtained in the support pose monitoring process, determining a current supporting pose;
 b2. by using an area array laser sensor, obtaining a contour line of a roof above the support, and determining a bulging edge of the roof;
 b3. obtaining a height difference between a support canopy and the roof, and establishing a height difference calculation mathematic model;
 b4. based on the height difference calculation mathematic model, calculating a target height and a target angle of roof attachment of the hydraulic support;
 b5. establishing a target angle-of-height calculation mathematic model, and determining, by calculation, a target angle of height of the support;
 b6. substituting the parameters of the target angle of height and the target angle of roof attachment into the pose monitoring mathematic model and by the interpolation algorithm, solving target lengths of the front prop and the rear prop.

Preferably, the interpolation algorithm includes a genetic algorithm and a particle swarm algorithm.

Preferably, the bulging edge of the roof is determined based on contour line data and Canny operator method.

Preferably, a nine-axis inclination sensor is disposed on a base of the hydraulic support, an explosion-proof level sensor is disposed on the front prop and the rear prop respectively, and an area array laser ranging sensor is disposed at two side surfaces of the canopy.

Further preferably, a spatial pose angle is determined for the base of the hydraulic support and a support coordinate system is determined; the lengths of the front prop and the rear prop are determined in real time monitoring.

Further preferably, the nine-axis inclination sensor, the explosion-proof level sensor and the area array laser ranging sensor transmit monitoring data to a control panel in which basic parameters of the hydraulic support are stored.

Further preferably, the basic parameters of the hydraulic support include a reference positioning height of a rear connection bar, a reference length of the rear connection bar, a distance of upper hinging points of a front connection bar and the rear connection bar, a distance of the upper hinging point of the front connection bar and a canopy-caving shield hinging point, a distance of an upper hinging point of the rear prop to the canopy-caving shield hinging point, a distance of the upper hinging points of the front and rear props, a vertical positioning distance of the front prop, a vertical positioning distance of the rear prop, a vertical positioning distance of a lower hinging point of the front connection bar, a vertical positioning distance of the rear connection bar, a length of the front connection bar, a transverse positioning distance of a lower hinging point of the rear prop, a transverse positioning distance of the lower hinging points of the front and rear props, and a horizontal swing angle of the front and rear props.

Further preferably, variable pose parameters of the hydraulic support include an included angle of the rear connection bar and a horizontal direction, an included angle of the rear connection bar and the base, an included angle of the rear connection bar and a caving shield, an included angle of the caving shield and a vertical direction, a length of the front prop, a length of the rear prop, and a distance between a connection end of the rear connection bar and the caving shield and a connection end of the front connection bar and the base.

Further preferably, the control panel calculates data parameters of the supporting pose of the hydraulic support and the roof contour, outputs a proportional control signal to control a proportional electromagnetic reversing valve to be turned on or off and adjusts the support pose.

Further preferably, the control panel sets a comparison threshold; when a comparison difference is greater than the threshold, a proportional controller outputs a Max control signal to achieve fast ascent of the support; when the comparison difference is less than the threshold, the proportional controller outputs Medium control signal to reduce impact effect of the support canopy on the roof during roof attachment; wherein an amplitude of the Max signal and the Medium signal is determined based on a maximum input signal of the selected proportional reversing valve, the Max signal is the maximum input signal and the Medium signal is half of the maximum input signal.

In the monitoring and controlling method for a supporting pose of a supporting type hydraulic support, the parameters of the hydraulic support are solved and determined by establishing different mathematic models, so as to determine the working pose of the hydraulic support. Based on monitoring and calculation for a supporting environment, target supporting parameters of the hydraulic support are determined; based on the parameters, adjustment is performed to control the pose of the hydraulic support. By using the monitoring and controlling method, remote visual control and remote intervention on the hydraulic support can be achieved, so as to provide conveniences for smart mine construction.

Numerals of the drawings are described below: 1. base, 2. rear connection bar, 3. front connection bar, 4. caving shield, 5. canopy, 6. front prop, 7. rear prop. 8. liquid sensor, 9. inclination sensor, 10. area array laser sensor, 11. roof contour line, 12. roof attachment trajectory line.

DETAILED DESCRIPTION OF THE EMBODIMENTS

In combination with FIGS. 1 to 6, a monitoring and controlling method for a supporting pose of a supporting type hydraulic support according to the present disclosure will be described below by way of specific embodiments.

Figure 1:
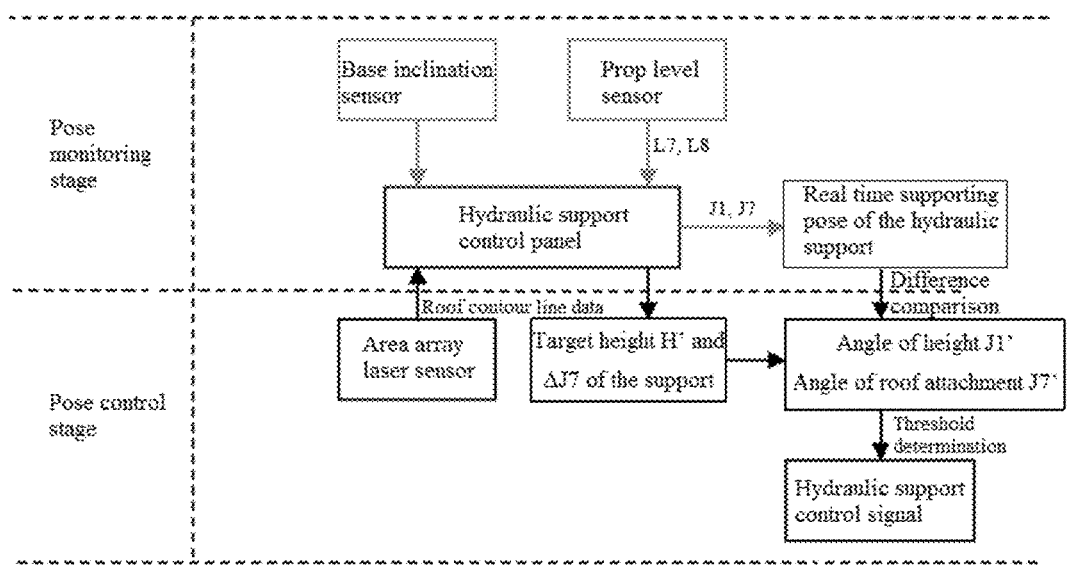
FIG. 1 is a flowchart illustrating a monitoring and controlling method of a supporting pose of a supporting type hydraulic support.
Figure 2:
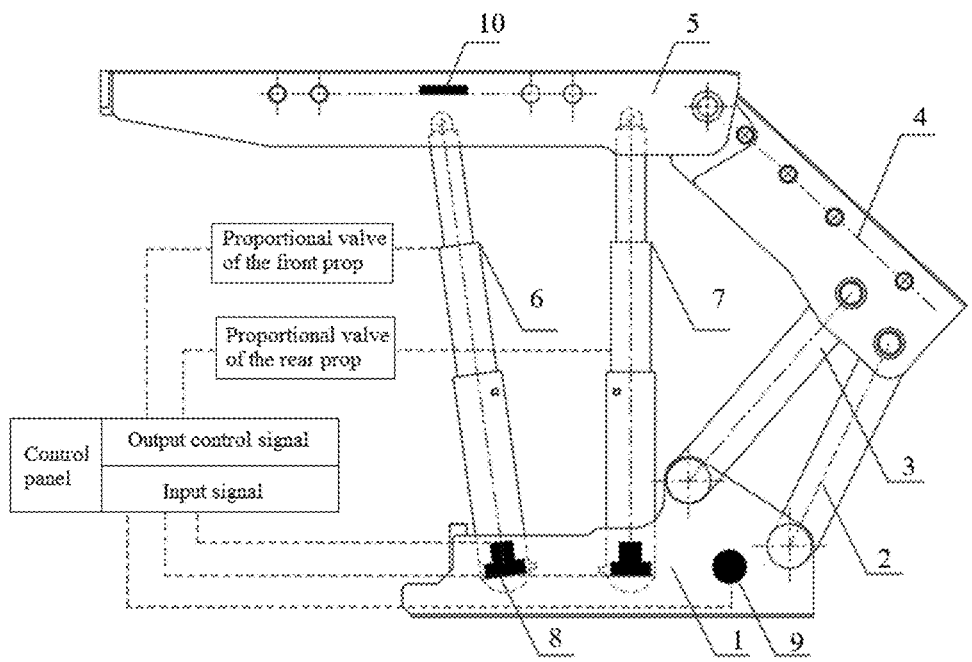
FIG. 2 is a structural schematic diagram of a hydraulic support.

There is provided a monitoring and controlling method for a supporting pose of a supporting type hydraulic support, which, as shown in FIG. 1, includes the following steps.

Figure 3:
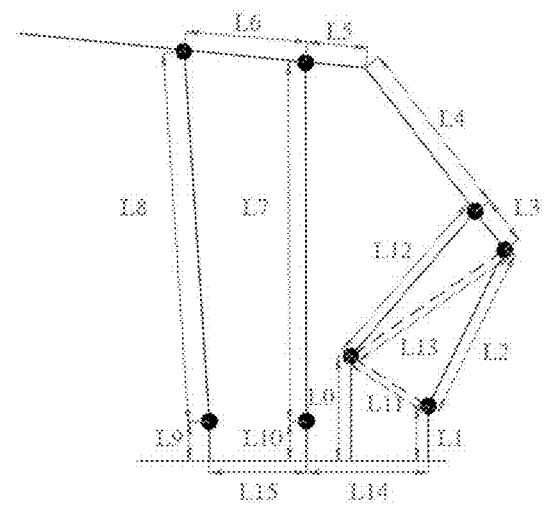
FIG. 3 is a schematic diagram of length parameters of a support pose.
Figure 4:
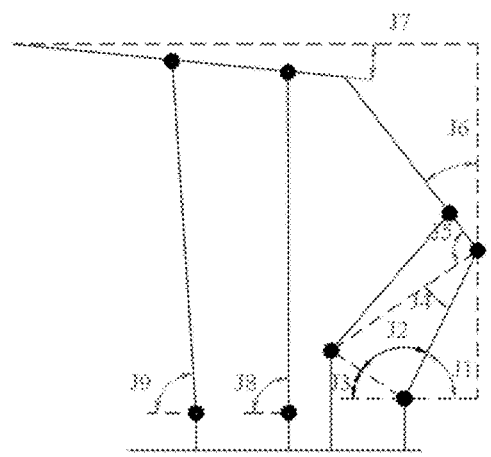
FIG. 4 is a schematic diagram of angle parameters of a support pose.
Figure 5:
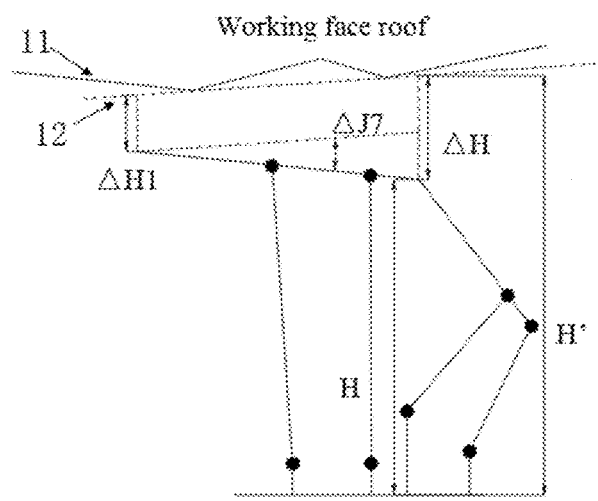
FIG. 5 is a principle diagram of control and adjustment of a roof and a support.
Figure 6:
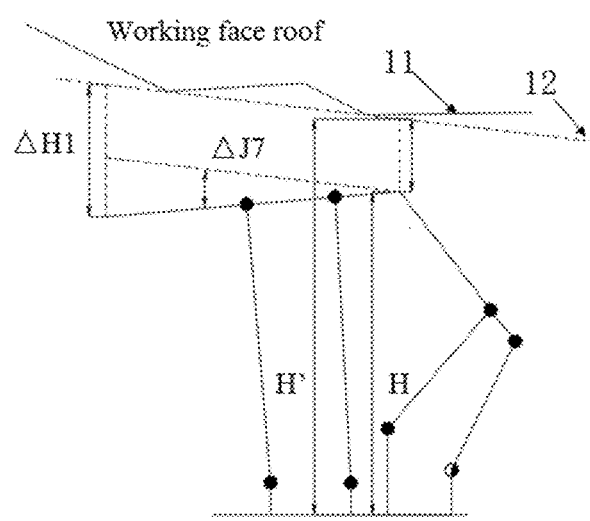
FIG. 6 is a principle diagram of control and adjustment of a support.

A. Support pose monitoring process:

a1. By using a prop level sensor of the hydraulic support, length parameters of a front prop and a rear prop are read. As shown in FIGS. 3 and 4, the basic parameters of the hydraulic support include a reference positioning height L1 of a rear connection bar, a reference length L2 of the rear connection bar, a distance L3 of upper hinging points of a front connection bar and the rear connection bar, a distance L4 of the upper hinging point of the front connection bar and a canopy-caving shield hinging point, a distance L5 of an upper hinging point of the rear prop to the canopy-caving shield hinging point, a distance L6 of the upper hinging points of the front and rear props, a vertical positioning distance L9 of the front prop, a vertical positioning distance L10 of the rear prop, a vertical positioning distance L10 of a lower hinging point of the front connection bar, a vertical positioning distance L11 of the rear connection bar, a length L12 of the front connection bar, a transverse positioning distance L14 of a lower hinging point of the rear prop, a transverse positioning distance L15 of the lower hinging points of the front and rear props, and a horizontal swing angle J3 of the front and rear props.

a2. In combination with a relationship of length parameter and angle parameter of the support, a pose monitoring mathematic model is established. The pose monitoring mathematic model specifically is: F(J1, J7)=f (J2, J4, J5, J6, J8, J9, L7, L8, L13)

$$F(x) = \begin{cases} \pi - J1 - J3 = J2 \\ \pi/2 + J1 - J4 - J5 = J6 \\ (L2^2 + L11^2 - 2L2L11\cos J2)^{1/2} = L13 \\ \cos^{-1}\left[(L2^2 + L13^2 - L11^2)/2L2L13\right] = J4 \\ \cos^{-1}\left[(L3^2 + L13^2 - L12^2)/2L3L13\right] = J5 \\ L1 + L2\sin J1 + (L3 + L4)\cos J6 + L5\sin J7 = L7\sin J8 + L10 \\ (L3 + L4)\sin J6 + L5\cos J7 - L2\cos J1 - L14 = L7\cos J8 \\ L1 + L2\sin J1 + (L3 + L4)\cos J6 + (L5 + L6)\sin J7 = L8\sin J9 + L9 \\ (L3 + L4)\sin J6 + (L5 + L6)\cos J7 - L2\cos J1 - (L14 + L15) = L8\cos J9 \end{cases}$$

Nine unknown variables J1, J2, J4, J5, J6, J8, J9, J7 and L13 and nine equilibrium equations are included. By interpolation algorithm such as genetic algorithm and particle swarm algorithm, fast solution is carried out so as to obtain current key pose parameters, i.e. an angle of height J1 and an angle of roof attachment J7, of the support as well as a full series of associated pose parameters such as angle of inclinations J8 and J9 of the props, where J7 is an included angle of the support canopy and the horizontal direction, which is a positive value when a front end of the canopy is higher than a rear end of the canopy, and is a negative value when the front end of the canopy is lower than the rear end of the canopy.

The variable pose parameters of the hydraulic support include an included angle of the rear connection bar and a horizontal direction, i.e. the angle of height J1, an included angle J2 of the rear connection bar and the base, an included angle J4 of the rear connection bar and a caving shield, an included angle J5 of the caving shield and a line connecting the caving shield with a connection end of the front connection bar and the base, an included angle J6 of the caving shield and a vertical direction, an angle of roof attachment J7, a length L8 of the front prop, a length L7 of the rear prop, and a distance L13 between a connection end of the rear connection bar and the caving shield and a connection end of the front connection bar and the base.

A controller, based on the basic parameters of the hydraulic support and the variable pose parameters of the hydraulic support, determines a real-time pose of the hydraulic support, and in association with parameter changes, achieves remote visual control on the hydraulic support.

a3. Based on an interpolation algorithm, equilibrium equations of the pose monitoring mathematic model are solved to obtain pose parameters comprising associated pose parameters of an angle of height, an angle of roof attachment, an angle of inclination of the front prop and an angle of inclination of the rear prop, where the interpolation algorithm includes a genetic algorithm and a particle swarm algorithm and the like.

B. Support pose control process:

b1. Based on the parameters obtained in the support pose monitoring process, a current supporting pose is determined.

b2. By using an area array laser sensor, a contour line of a roof above the support is obtained, and a bulging edge of the roof is determined; where the bugling edge of the roof is determined based on the contour line data and Canny operator method.

b3. A height difference between a support canopy and the roof is obtained, and a height difference calculation mathematic model is established. The height difference calculation mathematic model specifically is:

$$\begin{cases} H' = H + \Delta H \\ J7' = J7 + \Delta J7 \\ \cos^{-1}\{[Lx^2 + L^2 - (\Delta H1 - \Delta H)^2]/2LxL\} = \Delta J7 \\ L^2 + (\Delta H1 - \Delta H)^2 - Lx^2 = 2L(\Delta H1 - \Delta H)\cos(\pi/2 - J7) \end{cases}$$

where H' is a target height, H is a current height, $\Delta H$ is a height difference, $\Delta H1$ is a distance of projecting the front end of the target canopy to a dotted line below the working face canopy along a direction perpendicular to the base, J7' is a target angle of root attachment, $\Delta J7$ is a difference of roof attachment, L is a target length of the front and rear prop system, and Lx is an inclined length of projecting the canopy to the dotted line below the working face canopy along a direction perpendicular to the base.

b4. Based on the height difference calculation mathematic model, a target height and a target angle of roof attachment of the hydraulic support are calculated.

b5. A target angle-of-height calculation mathematic model is established, and a target angle of height of the support is determined by calculation. The target angle-of-height calculation mathematic model specifically is:

$$\begin{cases} H' = L2\sin J1' + (L3 + L4)\cos J6' + L1 \\ J4' + J5' - J1' - \pi/2 = J6' \\ \cos^{-1}[(L2^2 + L13^2 - L11^2)/2L2L13'] = J4' \\ \cos^{-1}[(L3^2 + L13^2 - L12^2)/2L3L13'] = J5' \\ [L2^2 + L11^2 - 2L2L11\cos(\pi - J1' - J3)]^{1/2} = L13' \end{cases}$$

The target height H' of the hydraulic support is directly substituted into the above mathematic model to calculate the target angle of height J1' of the support. b6. The parameters of the target angle of height and the target angle of roof attachment are substituted into the pose monitoring mathematic model and target lengths of the front prop and the rear prop are solved by the interpolation algorithm. The interpolation algorithm includes a genetic algorithm and a particle swarm algorithm and the like. The parameters of the target angle of height and the target angle of roof attachment are substituted into the pose monitoring mathematic model which includes nine unknown variables L7, L8, J2, J4, J5, J6, J8, J9 and L13 (F(L7, L8)==f (J1, J2, J4, J5, J6, J7, J8, J9, L13)), and further, by using various interpolation algorithms, solving the target lengths L7' and L8' of the props is achieved.

A nine axis inclination sensor with model being WIT MOTION BWT901CL is disposed on the base of the hydraulic support. An explosion-proof level sensor with the model being MIRAN MTC-3000 is disposed at the front prop and the rear prop respectively. An area array laser ranging sensor with the model being HPS-3D160 is disposed on two side surfaces of the canopy. A spatial pose angle is determined for the base of the hydraulic support and a support coordinate system is determined; the lengths of the front prop and the rear prop are determined in real time monitoring.

The nine-axis inclination sensor, the explosion-proof level sensor and the area array laser ranging sensor transmit monitoring data to a control panel in which the basic parameters of the hydraulic support are stored. The control panel calculates data parameters of the supporting pose of the hydraulic support and the roof contour, outputs a proportional control signal to control a proportional electromagnetic reversing valve to be turned on or off and adjusts the support pose. The controller reads the roof contour data, calculates the key target poses, i.e. the target height H' and the target angle of roof attachment J7' of the hydraulic support, performs reverse calculation on the target lengths of the front and rear prop system, compares them with current prop lengths of the hydraulic support, and based on a comparison difference, outputs a proportional control signal to control the proportional electromagnetic reversing valve to be turned on or off. The control panel sets a comparison threshold; when a comparison difference is greater than the threshold, a proportional controller outputs a Max control signal to achieve fast ascent of the support; when the comparison difference is less than the threshold, the proportional controller outputs Medium control signal to reduce impact effect of the support canopy on the roof during roof attachment; wherein an amplitude of the Max signal and the Medium signal is determined based on a maximum input signal of the selected proportional reversing valve, the Max signal is the maximum input signal and the Medium signal is half of the maximum input signal.

In the monitoring and controlling method, the parameters of the hydraulic support are solved and determined by establishing different mathematic models, so as to determine the working pose of the hydraulic support. Based on monitoring and calculation for a supporting environment, target supporting parameters of the hydraulic support are determined; based on the parameters, adjustment is performed to control the pose of the hydraulic support. By using the monitoring and controlling method, remote visual control and remote intervention on the hydraulic support can be achieved, so as to provide conveniences for smart mine construction.

Of course, the above descriptions are not intended to limit the present disclosure and the present disclosure is not limited to the above embodiments. Any changes, variations, additions or replacements made by those skilled in the art within the essence scope of the present disclosure shall fall within the scope of protection of the present disclosure.

The invention claimed is:

1. A monitoring and controlling method for a supporting pose of a supporting type hydraulic support, comprising:
   A. support pose monitoring process:
   a1. by using a prop level sensor of the hydraulic support, reading length parameters of a front prop and a rear prop;
   a2. in combination with a relationship of length parameter and angle parameter of the support, establishing a pose monitoring mathematic model;
   a3. based on an interpolation algorithm, solving equilibrium equations of the pose monitoring mathematic model to obtain pose parameters comprising associated pose parameters of an angle of height, an angle of roof attachment, an angle of inclination of the front prop and an angle of inclination of the rear prop;
   B. support pose control process:
   b1. based on the parameters obtained in the support pose monitoring process, determining a current supporting pose;
   b2. by using an area array laser sensor, obtaining a contour line of a roof above the support, and determining a bulging edge of the roof;
   b3. obtaining a height difference between a support canopy and the roof, and establishing a height difference calculation mathematic model;
   b4. based on the height difference calculation mathematic model, calculating a target height and a target angle of roof attachment of the hydraulic support;
   b5. establishing a target angle-of-height calculation mathematic model, and determining, by calculation, a target angle of height of the support;
   b6. substituting the parameters of the target angle of height and the target angle of roof attachment into the pose monitoring mathematic model and by the interpolation algorithm, solving target lengths of the front prop and the rear prop;
   wherein the control panel outputs a proportional control signal, based on the solved target lengths, to adjust the support pose.

2. The method of claim 1, wherein the interpolation algorithm comprises a genetic algorithm and a particle swarm algorithm.

3. The method of claim 1, wherein the bulging edge of the roof is determined based on contour line data and Canny operator method.

4. The method of claim 1, wherein a nine-axis inclination sensor is disposed on a base of the hydraulic support, an explosion-proof level sensor is disposed on the front prop and the rear prop respectively, and an area array laser ranging sensor is disposed at two side surfaces of the canopy.

5. The method of claim 4, wherein a spatial pose angle is determined for the base of the hydraulic support and a support coordinate system is determined; the lengths of the front prop and the rear prop are determined in real time monitoring.

6. The method of claim 4, wherein the nine-axis inclination sensor, the explosion-proof level sensor and the area array laser ranging sensor transmit monitoring data to a control panel in which basic parameters of the hydraulic support are stored.

7. The method of claim 6, wherein the basic parameters of the hydraulic support comprise a reference positioning height of a rear connection bar, a reference length of the rear connection bar, a distance of upper hinging points of a front connection bar and the rear connection bar, a distance of the upper hinging point of the front connection bar and a canopy-caving shield hinging point, a distance of an upper hinging point of the rear prop to the canopy-caving shield hinging point, a distance of the upper hinging points of the front and rear props, a vertical positioning distance of the front prop, a vertical positioning distance of the rear prop, a vertical positioning distance of a lower hinging point of the front connection bar, a vertical positioning distance of the rear connection bar, a length of the front connection bar, a transverse positioning distance of a lower hinging point of the rear prop, a transverse positioning distance of the lower hinging points of the front and rear props, and a horizontal swing angle of the front and rear props.

8. The method of claim 6, wherein variable pose parameters of the hydraulic support comprise an included angle of the rear connection bar and a horizontal direction, an included angle of the rear connection bar and the base, an included angle of the rear connection bar and a caving shield, an included angle of the caving shield and a vertical direction, a length of the front prop, a length of the rear prop, and a distance between a connection end of the rear connection bar and the caving shield and a connection end of the front connection bar and the base.

9. The method of claim 6, wherein the control panel calculates data parameters of the supporting pose of the hydraulic support and the roof contour, outputs a proportional control signal to control a proportional electromagnetic reversing valve to be turned on or off and adjusts the support pose.

10. The method of claim 9, wherein the control panel sets a comparison threshold; when a comparison difference is greater than the threshold, a proportional controller outputs a Max control signal to achieve fast ascent of the support; when the comparison difference is less than the threshold, the proportional controller outputs Medium control signal to reduce impact effect of the support canopy on the roof during roof attachment; wherein an amplitude of the Max signal and the Medium signal is determined based on a maximum input signal of the selected proportional reversing valve, the Max signal is the maximum input signal and the Medium signal is half of the maximum input signal.

* * * * *